(12) United States Patent
Matthews

(10) Patent No.: US 9,117,347 B2
(45) Date of Patent: Aug. 25, 2015

(54) METHOD AND APPARATUS FOR A FLEXIBLE HOUSING

(71) Applicant: Nokia Corporation, Espoo (FI)

(72) Inventor: Andrew Peter Matthews, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 49 days.

(21) Appl. No.: 13/775,746

(22) Filed: Feb. 25, 2013

(65) Prior Publication Data

US 2014/0240108 A1   Aug. 28, 2014

(51) Int. Cl.
| | |
|---|---|
| *H04B 3/36* | (2006.01) |
| *G08B 6/00* | (2006.01) |
| *G06F 3/01* | (2006.01) |
| *G06F 1/16* | (2006.01) |
| *H04M 1/02* | (2006.01) |

(52) U.S. Cl.
CPC ............... *G08B 6/00* (2013.01); *G06F 1/1626* (2013.01); *G06F 3/016* (2013.01); *H04M 1/0202* (2013.01); *Y10T 29/49117* (2015.01)

(58) Field of Classification Search
CPC ......... G06F 3/016; G06F 1/1626; G08B 6/00; H04M 1/0202; Y10T 29/49117
USPC ............... 345/173; 341/27; 340/407.1, 407.2, 340/693.5
See application file for complete search history.

(56) References Cited

U.S. PATENT DOCUMENTS

| | | | |
|---|---|---|---|
| 2009/0001855 | A1 | 1/2009 | Lipton et al. .................. 310/331 |
| 2009/0088220 | A1* | 4/2009 | Persson ...................... 455/567 |
| 2010/0069719 | A1* | 3/2010 | Wehrheim .................... 600/152 |
| 2012/0126959 | A1 | 5/2012 | Zarrabi et al. ............. 340/407.1 |
| 2012/0161949 | A1 | 6/2012 | Fong et al. ................. 340/407.2 |
| 2012/0206248 | A1 | 8/2012 | Biggs et al. ................ 340/407.2 |
| 2013/0076649 | A1* | 3/2013 | Myers et al. .................. 345/173 |

OTHER PUBLICATIONS

Yoseph Bar-Cohen; Directions for development of the field of electroactive polymer (EAP), Proc. SPIE 7976, Electroactive Polymer Actuators and Devices (EAPAD) 2011, 797604 (Mar. 28, 2011); doi:10.1117/12.880056 (Abstract).

Wikipedia contributors, "Electroactive polymers." Wikipedia, The Free Encyclopedia. Wikipedia, The Free Encyclopedia, Aug. 9, 2012, Web, Oct. 9, 2012.

Kildal, et al.; "Kinetic device: designing interactions with a deformable mobile interface," CHI EA '12 CHI '12 Extended Abstracts on Human Factors in Computing Systems; pp. 1871-1876; ACM New York, NY, USA © 2012.

* cited by examiner

*Primary Examiner* — Thomas Mullen
(74) *Attorney, Agent, or Firm* — Harrington & Smith

(57) ABSTRACT

In accordance with an example embodiment of the present invention, an apparatus is disclosed. The apparatus includes a housing having a substantially rigid portion and a substantially flexible portion. The substantially rigid portion includes a plurality of openings. The substantially flexible portion is at the plurality of openings. The substantially flexible portion is configured to provide haptic feedback, or generate a voltage.

20 Claims, 15 Drawing Sheets

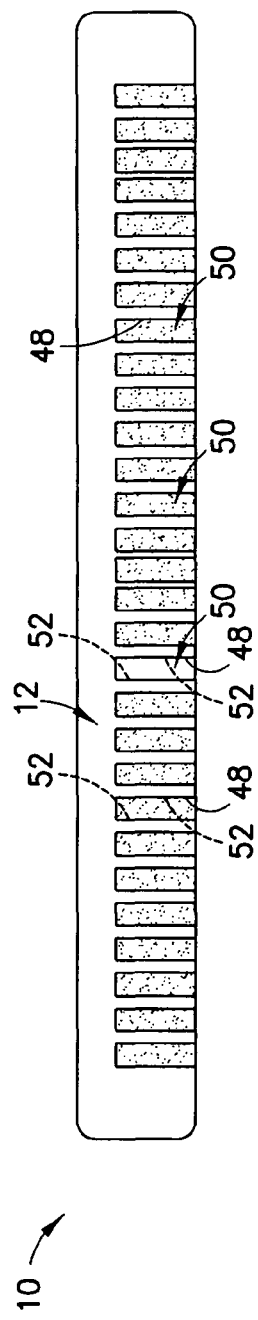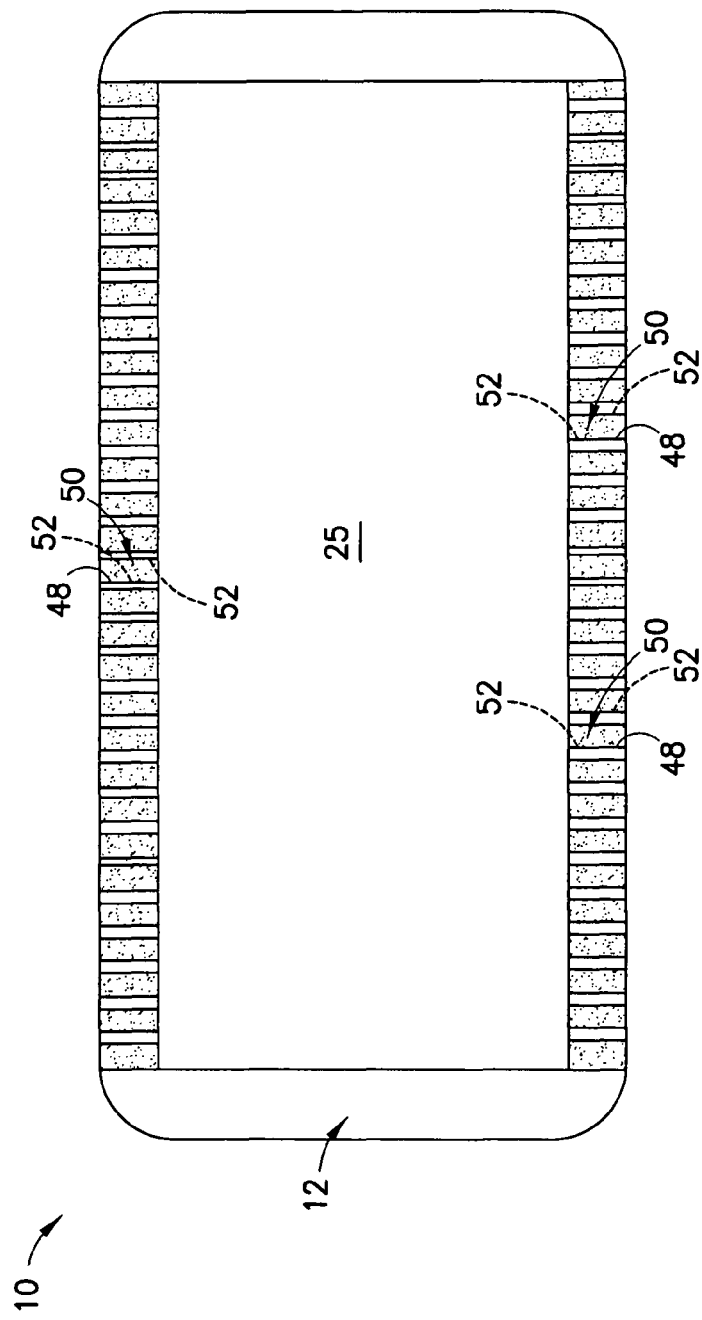

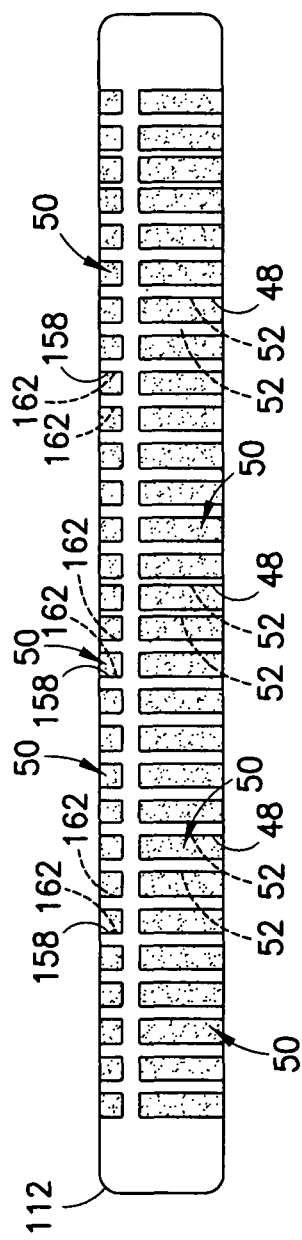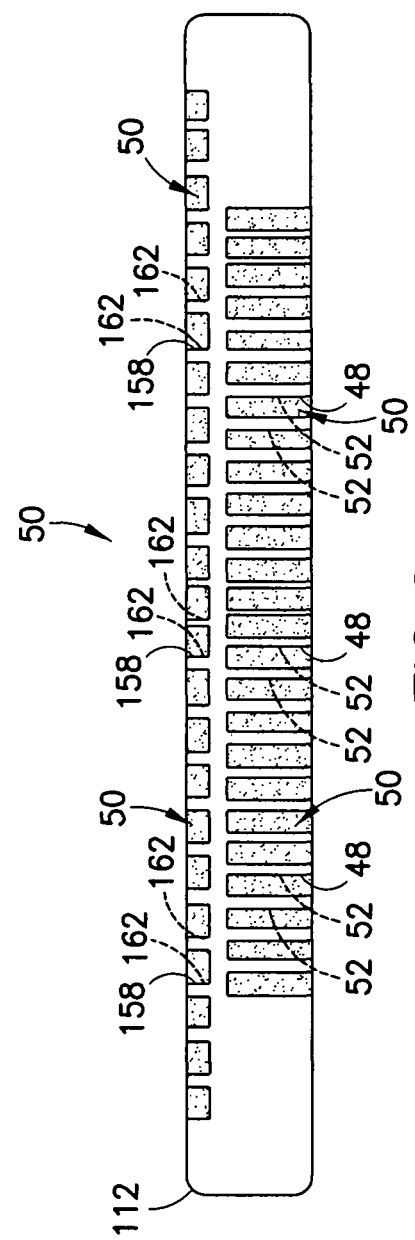

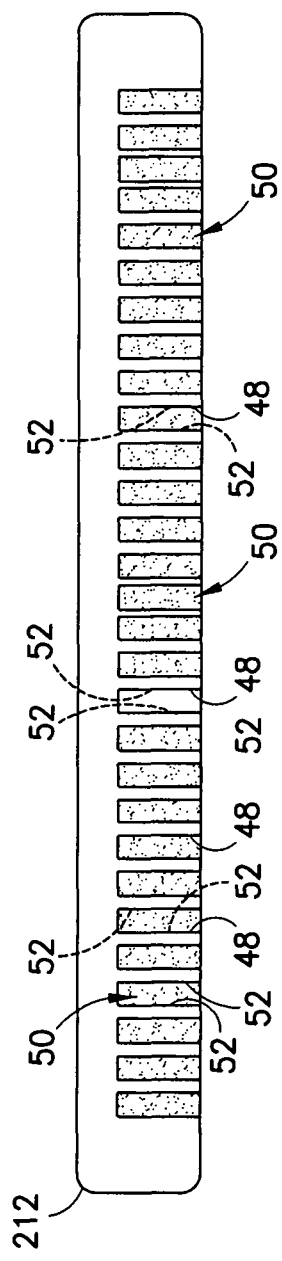
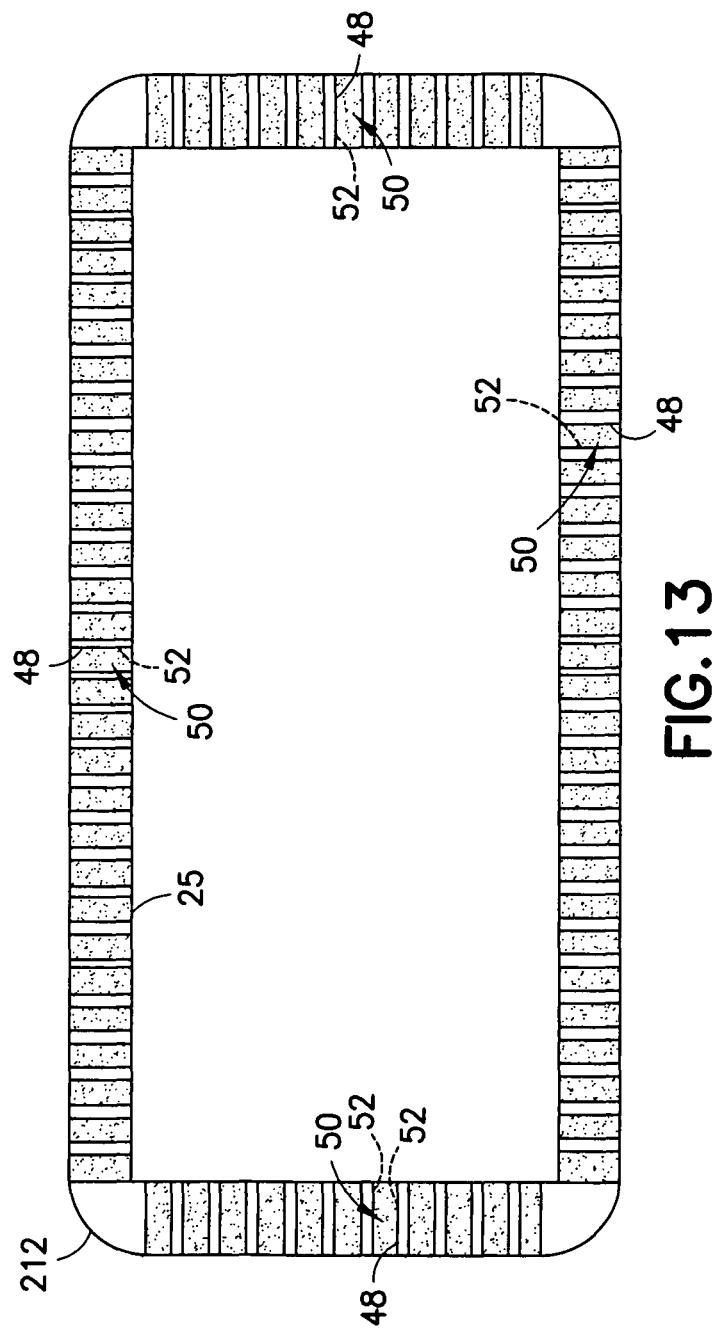

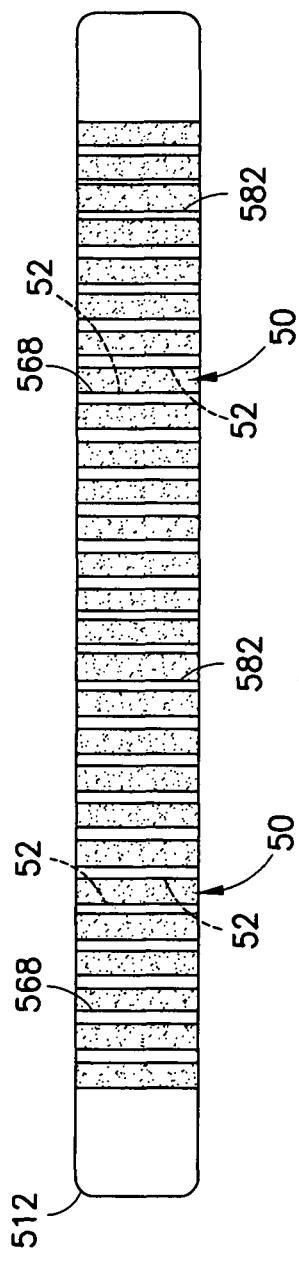
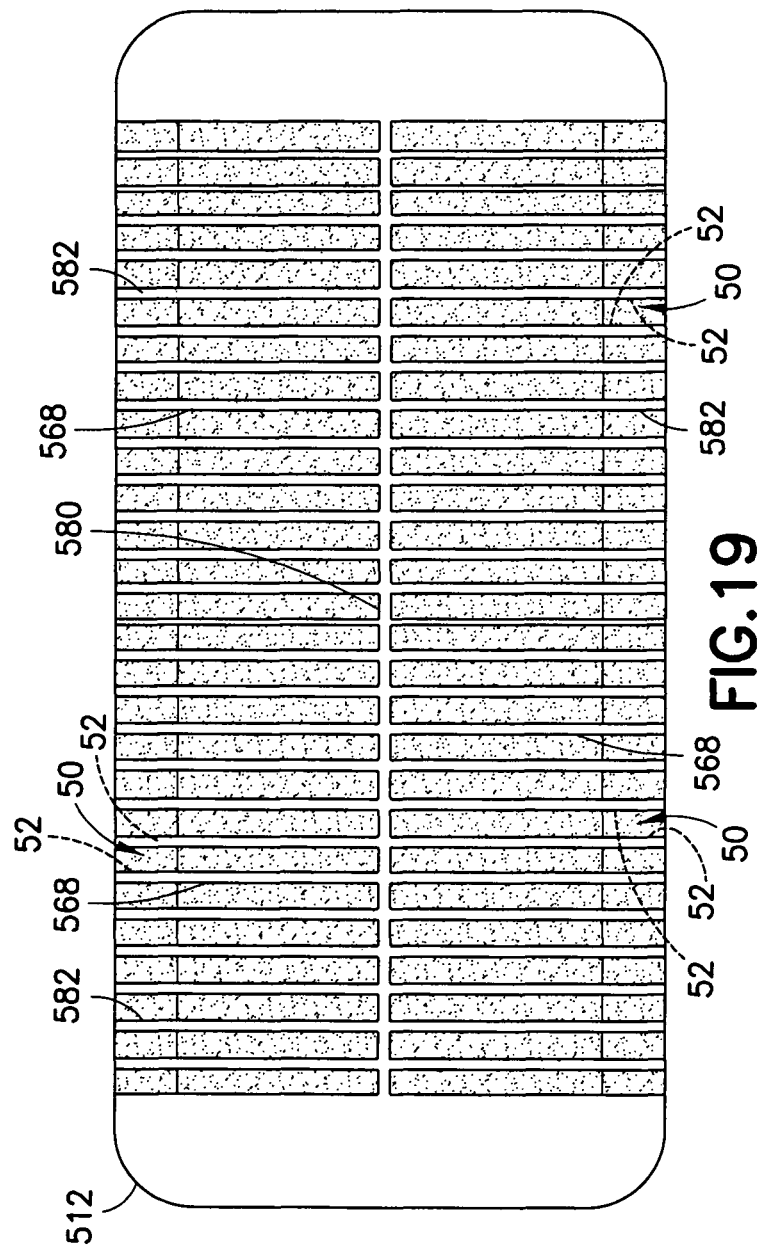

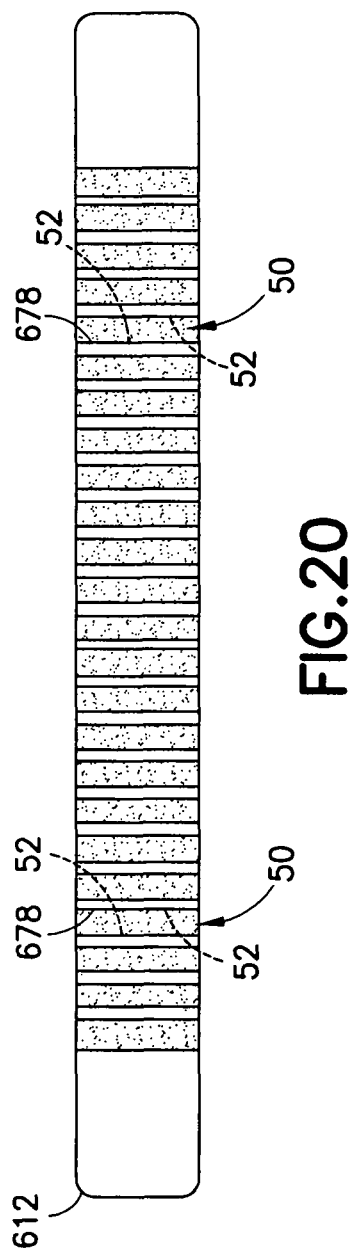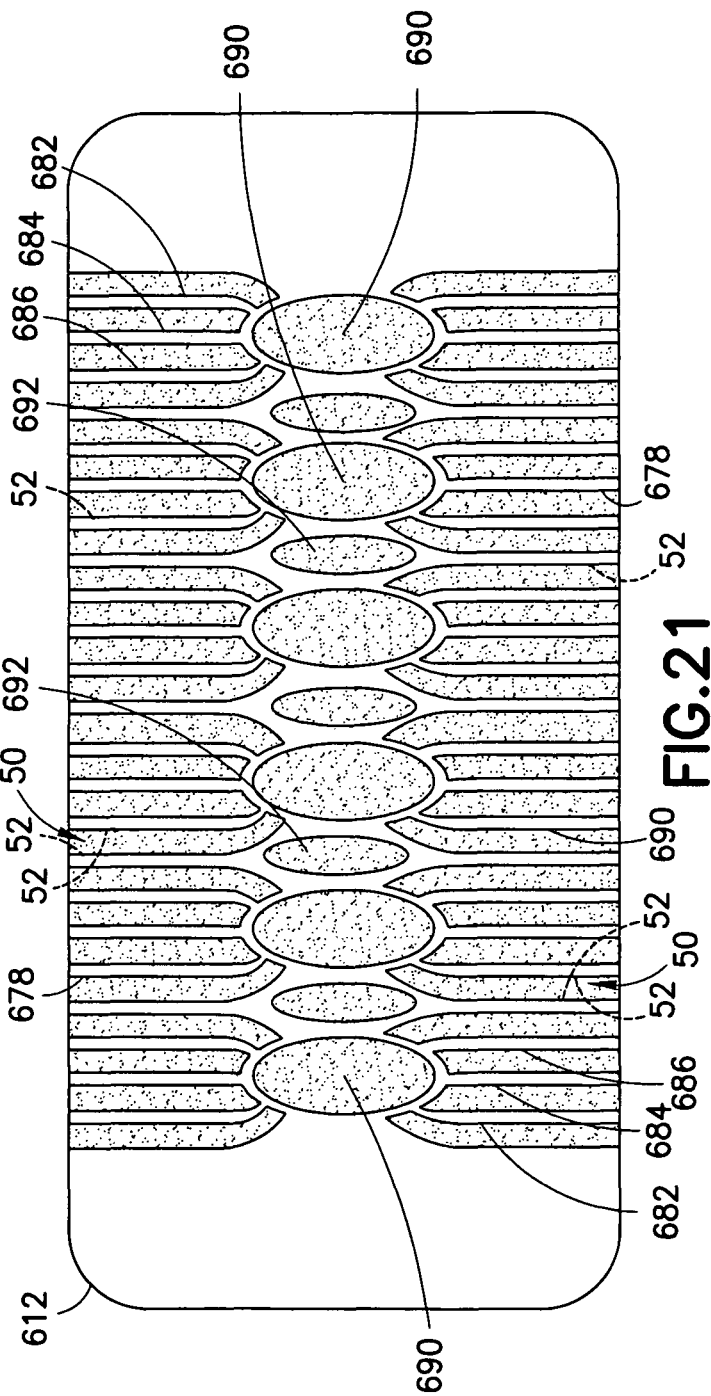

METHOD AND APPARATUS FOR A FLEXIBLE HOUSING

TECHNICAL FIELD

The invention relates to a flexible housing and, more particularly, to a flexible housing having an actuator.

BACKGROUND

An electronic device typically comprises a variety of user interface components that enable users to interact with the electronic device. User interface components in portable electronic devices generally provide for, compactness, suitability for mass manufacturing, durability, and ease of use. Increase of computing power of portable devices is turning them into versatile portable computers, which can be used for multiple different purposes. Therefore versatile user interface components are needed in order to take full advantage of capabilities of mobile devices.

Additionally, smartphone battery life generally does not last more than one day, and frequent (daily) charging is necessitated. While under most circumstances this is acceptable to consumers, it is also the subject of considerable consumer dissatisfaction, and battery lifetime is a strong driver of sales success. This is also a concern for emergency call use, should battery power run out and calls be made impossible.

SUMMARY

Various aspects examples of the invention are set out in the claims.

According to a first aspect of the present invention, an apparatus is disclosed. The apparatus includes a housing having a substantially rigid portion and a substantially flexible portion. The substantially rigid portion includes a plurality of openings. The substantially flexible portion is at the plurality of openings. The substantially flexible portion is configured to provide haptic feedback, or generate a voltage.

According to a second aspect of the present invention, a method is disclosed. A housing is provided. The housing includes a substantially rigid portion and a substantially flexible portion. A series of openings is provided at the substantially rigid portion. The substantially flexible portion is at the series of openings. An electrode is provided at the opening. The electrode is proximate the substantially flexible portion. The substantially flexible portion is configured to provide haptic feedback, or generate a voltage.

According third aspect or the present invention, a computer program product is disclosed. The computer program product includes a computer-readable medium bearing computer program code embodied therein for use with a computer. The computer program code includes code energizing an electrode. The electrode is at a substantially flexible material a portable device housing. Code for providing a substantial bending or twisting of the portable device housing in response to the energizing of the electrode.

BRIEF DESCRIPTION OF THE DRAWINGS

For a more complete understanding of example embodiments of the present invention, reference is now made to the following descriptions taken in connection with the accompanying drawings in which:

FIG. 3 is a side view of a hybrid structure used in the device shown in FIG. 1;

FIG. 4 is a top view of a hybrid structure used in the device shown in FIG. 1;

FIG. 5 is a side view of another example hybrid structure used in the device shown in FIG. 1;

FIG. 6 is a side view of another example hybrid structure used in the device shown in FIG. 1;

FIGS. 12-13 are side and top views, respectively, of another example housing used in the device shown in FIG. 1;

FIG. 18 is a side view of another example housing used in the device shown in FIG. 1;

FIG. 19 is a top view the housing shown in FIG. 18;

FIG. 20 is a side view of another example housing used in the device shown in FIG. 1;

FIG. 21 is a top view the housing shown in FIG. 20;

DETAILED DESCRIPTION OF THE DRAWINGS

An example embodiment of the present invention and its potential advantages are understood by referring to FIGS. 1 through 30 of the drawings.

Figure 2:
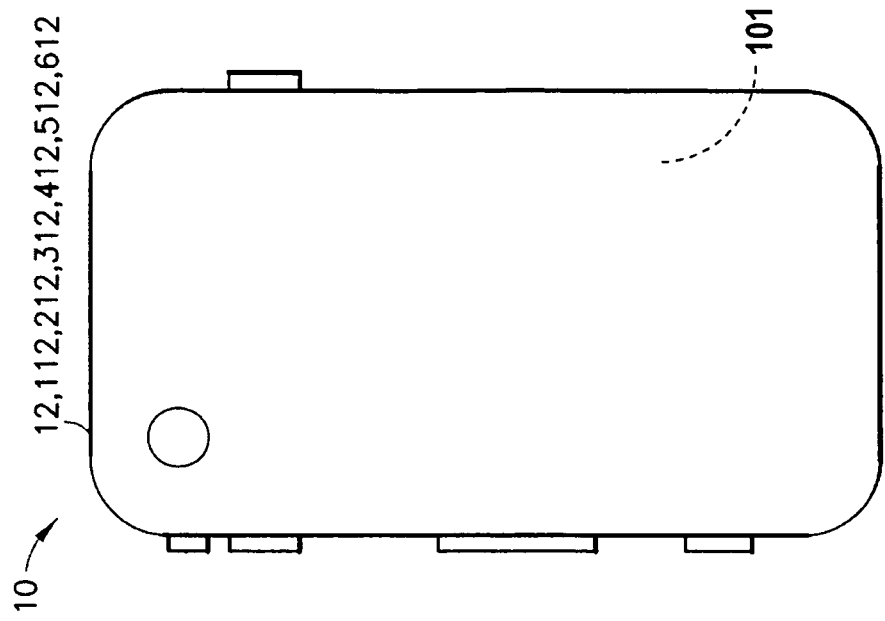
FIG. 2 is a rear view of the electronic device shown in FIG. 1.
Figure 1:
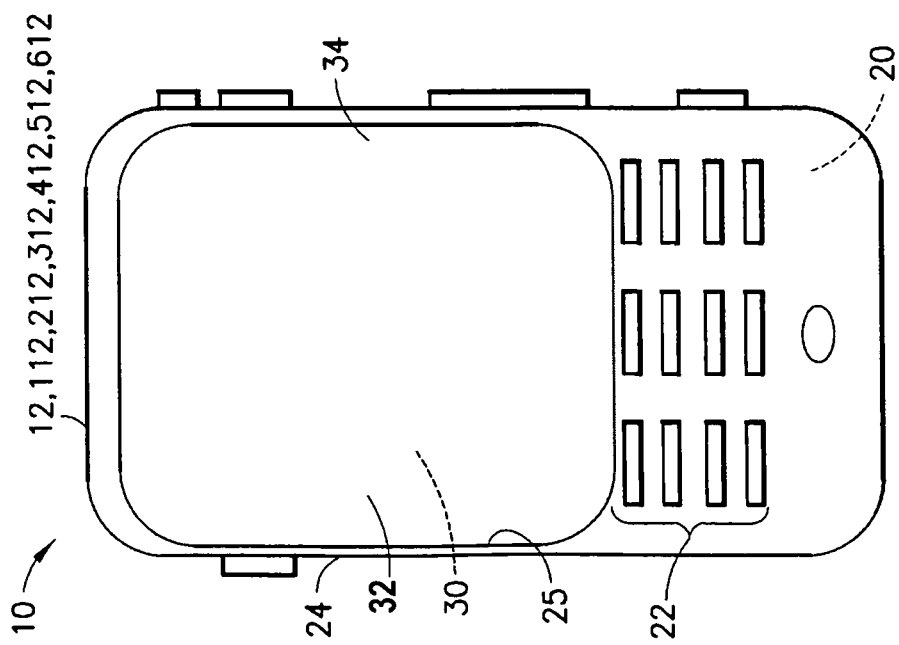
FIG. 1 is a front view of an electronic device incorporating features of the invention.

Referring to Figs. 1-2 there are shown front/rear views of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the device is a portable electronic device. However, in alternate embodiments, features of the various embodiments of the invention could be used in any suitable type of portable electronic device such as a mobile phone, a gaming device, a music player, a notebook computer, a tablet, an e-reader, a camera, or a personal digital assistant, for example. As is known in the art, the device 10 can include multiple features or applications such as a camera, a music player, a game player, or an Internet browser, for example. Alternatively, the device 10 might have very limited functionality such as a watch or wrist-worn or clip-on notification or sensing device, for example. The device 10 generally comprises a housing 12, electronic circuitry 20, such as a controller (which could include a processor, for example) and a memory for example, within the housing 12, a user input region 22 and a display assembly 24. The display assembly 24 could also form a user input section, such as a touch screen. According to some embodiments of the invention, the display assembly 24, which may also be referred to as a window, touch panel or display stack, generally includes a window 30, a touch panel sensor 32, and a display 34. The housing 12 further comprises a display aperture 25 that is generally sized and shaped corresponding to user viewable portions of the display assembly 24. It should be noted that in alternate embodiments, the device 10 can have any suitable type of features as known in the art.

According to various exemplary embodiments of the invention, the device 10 is a flexible device wherein the housing 12 comprises a flexible housing and/or the display assembly 24 comprises a flexible display assembly. However, according to some embodiments of the invention, portions of the housing and/or display may be flexible while other portions of the housing and/or display are substantially rigid.

Various exemplary embodiments of the invention relate to an implementation of Electro-Active Polymer (PAP) and piezoelectric actuators in mobile (handheld) devices for maintaining the display at the neutral strain plane in the cross section of a flexible mobile device, providing haptic feedback response, and/or generating energy by harvesting.

Various exemplary embodiments of the invention provide for a mobile device body (or housing) that allows flexibility, while also possibly, but not exclusively, maintaining the display at the neutral strain plane in the cross section of the device. According to some embodiments of the inventions, the soft material used to enhance flexibility in the flexible housing could comprise an electroactive polymer (EAP) or piezoelectric material (PEP), such as Polyvinylidene fluoride.

If an EAP or PEP is used, then this allows for a haptic user interface to be implemented and further allows for energy to be harvested from the flexure of the device, as will be described in further detail below.

When the flexural modalities of the mobile device 10 are considered, it may be anticipated that the device 10 can be bent about one or more axes as well as twisted. In order to allow the device 10 to flex easily, given the general thickness of mobile electronic devices (which are currently of order >5 mm) it is generally preferable to either manufacture the entire housing body out of a flexible material, or to create a hybrid construction of soft and rigid materials.

FIGS. 3-4 show one example embodiment of the housing 12 comprising a hybrid structure, using Electro-Active Polymers (EAPs), or piezoelectric polymers (hereinafter referred to simply as PEPs for brevity) or electrostatic plates between features of the relatively rigid housing material. This type of configuration provides for the housing to have a substantially rigid portion and a substantially flexible portion. The housing 12 may be machined from, or cast in, a relatively (or substantially) stiff polymer material that accommodates flexural movement (i.e. is not brittle) in such a way that castellations (or deep ridges) 48 are formed along the (lateral) sides of the device 10 that are expected to bend. These ridges 48 may protrude deep into the cross section of the housing 12 in order to reduce the moment of inertia of the section of the housing 12 and move the neutral plane of the cross section of the housing 12 closer to a desired location. One example of such a desired location may be the plane of the surface on which the window 30 of the display assembly 24 will be adhered. The ridges 48 may even be so deep as to place the neutral plane of the housing 12 within the plane of the window 30.

According various exemplary embodiments of the invention, some or all of the spaces or voids formed by the ridges 48 can be filled with a flexible material 50 whose properties are selected to balance the stiffness and moment of inertia of the cross section of the ridged housing 12 in such a way that the overall moment of inertia of the entire assembly 10, whether this includes the additional electronics and battery or otherwise, beneath the plane of the display or the interface between the display 34 and the touch panel 32 or window 30 as close as reasonable to the moment of inertia of the housing 12 and window components above the plane of the display or interface. In other words, in various exemplary embodiments of the invention the dimensions of the castellations 48 and spacing between them is designed to be optimized for the desired flexural properties of the assembly and the elasticity of the polymer material inserted between the castellations 48. One purpose would be to minimize the actuation forces required, while another purpose might be to balance the moments of inertia of the cross-sections above and below the plane of the display or interface between the display 34 and the touch panel 32 or window 30. Various exemplary embodiments of the invention maintain the neutral plane as close as is reasonable to the display plane and minimize the strain imparted on the display 34 by the window 30 and touch panel 32 (if present) for the entire mobile device assembly 10.

As described above and illustrated in FIGS. 3 and 4, various exemplary embodiments of the housing 12 comprise castellated (ridged) regions 48 that can reduce the bending moment of the cross-section of the housing 12 (and the overall device 10).

It should be noted that while the various exemplary embodiments have been described in connection with castellated (ridged) regions 48 extending from one of the faces of the housing (or device), one skilled in the art will appreciate that the various exemplary embodiments are not necessarily so limited and that other configurations for the castellated (ridged) regions may be provided. For example, and referring now also to FIG. 5, one alternate embodiment of the invention is shown. In this example embodiment, the housing 112 is similar to the housing 12. For example, similar to the housing 12, the housing 112 comprises a hybrid structure having castellated (ridged) regions 48. However, the ridges may be placed on one or both sides (top and bottom) of the neutral bending plane of the cross-section of the device (as shown in FIGS. 5-6). In this example embodiment, the housing 112 further comprises castellated (ridged) regions 158. The castellated (ridged) regions 158 are also formed along the (lateral) sides of the device 10 that are expected to bend, and are provided so as to extend from an opposite face of the housing (or device) relative to the castellated (ridged) regions 48. It should further be noted that although FIG. 5 illustrates the castellated (ridged) regions 158 spaced along one face of the housing 112 a substantially equal distance as the castellated (ridged) regions 48 spaced along the opposite face of the housing, alternate configurations may be provided. For example, FIG. 6 illustrates the castellated (ridged) regions 158 spaced along one face of the housing 112 a substantially greater distance than the castellated (ridged) regions 48 spaced along the opposite face of the housing.

Similar to the housing 12, the housing 112 provides castellated (ridged) regions that reduce the bending moment of the cross-section of the housing 112. The neutral bending plane of the cross section can be adjusted by the depth of the grooves, which can be placed on one side (as in FIGS. 3-4) or both sides (as in FIGS. 5-6) of the desired neutral plane. One or more of the sides may be completely or partially filled with EAP or PEP or a combination of the two classes of materials to provide a bending force about the cross-sectional neutral plane when a voltage is applied across the EAP or PEP. The number, depth and dimensions of the castellations or grooves may be the same on either side of the neutral plane, or different and the distribution of these parameters may be non-uniform along the length of the surface to be bent.

Figure 7:
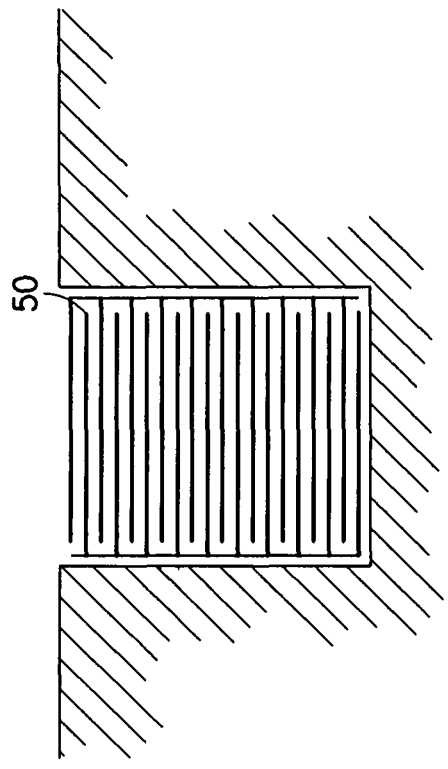
FIGS. 7-8 are section views of multi-layer structures used in the device shown in FIG. 1.
Figure 8:
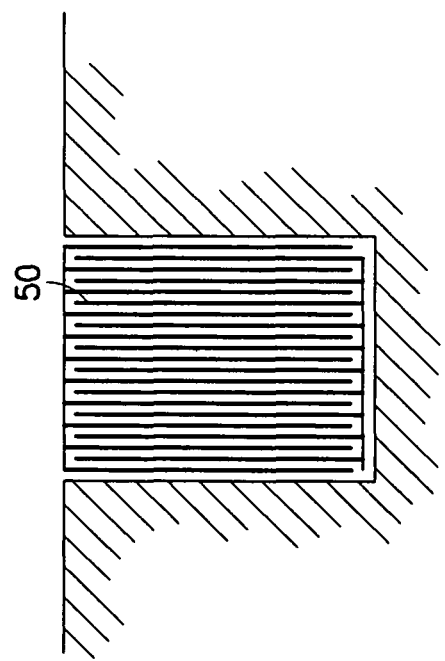
Figure 9:
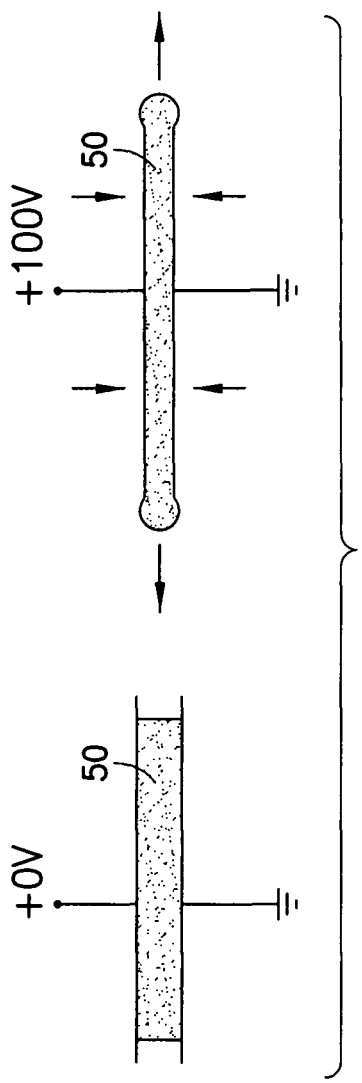
FIG. 9 is diagram of a potential difference at a material used in the device shown in FIG. 1.
Figure 10:
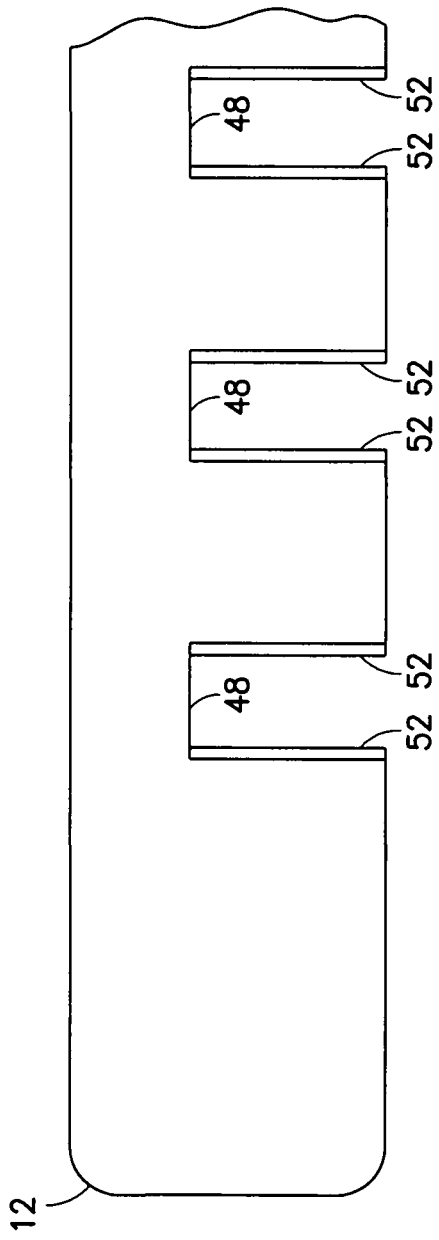
FIG. 10 is n example housing used in the device shown in FIG. 1.
Figure 11:
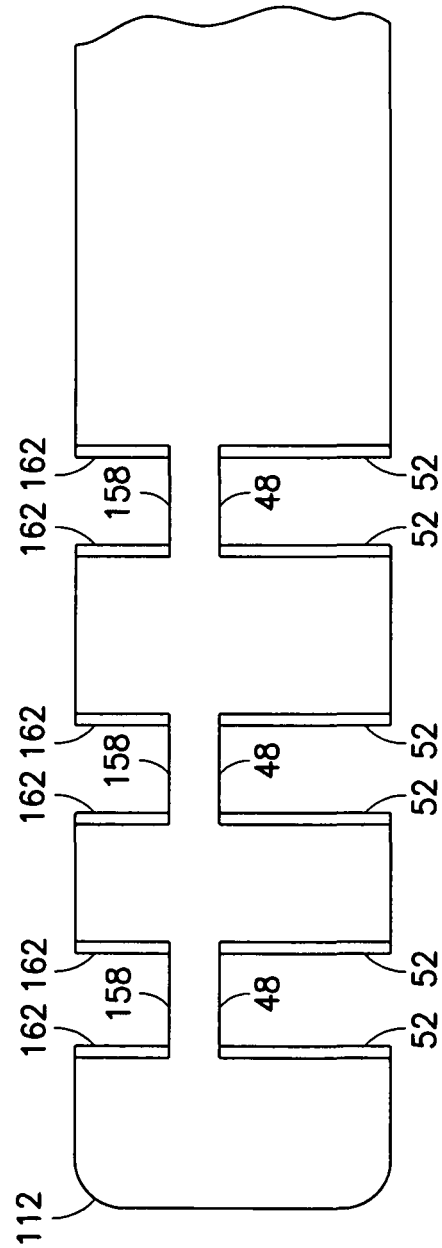
FIG. 11 is another example housing used in the device shown in FIG. 1.

As mentioned above, according to some example embodiments of the invention, the flexible material 50 may comprise an Electro-Active Polymer (EAP) or polymer piezoelectric (PEP) material. Electro-Active Polymers (EAPs) and piezoelectric materials (PEPs) generally exhibit a change in dimension when a voltage is placed across them. The displacements produced by this voltage-induced dimensional change can be substantial. Therefore, some embodiments of the invention may further comprise electrodes 52, 162 disposed within the voids/spaces formed by the castellations 48, 158. Various such embodiments are envisaged filling or partially filling the spaces with single layers of EAP or PEP, or multi-layer structures formed of layers of EAP or PEP separated by multiple electrodes as shown in FIGS. 7 and 8. As can be seen in FIG. 9, applying a potential difference across the electrodes causes the material to contract or expand in a direction perpendicular to the electrode plane. At the same time, as the material contracts in a direction perpendicular to the electrodes, it elongates in the plane parallel to the electrodes. It is clear that both approaches to actuation or energy harvesting could be used, but typically the strain generated perpendicular to the electrodes is significantly larger, and this is therefore the preferred approach. This approach is shown in FIG. 7.

Various exemplary embodiments of the invention provide advantages and benefits when the flexible material comprises an EAP or PEP. Firstly, the EAP/PEP 50, combined with the electrodes 52, 162 to apply a voltage across the EAP/PEP 50, can be used to provide haptic feedback to a user of the device 10. This arrangement has the advantage that a) the movement created can be either rotational or translational; and b) the total thickness of the accumulated EAP/PEP cell heights (each space between the castellations being considered one EAP/PEP cell) can be centimeters in length, allowing very large movements (rotations or translations) of the device to be generated. This extends the possibilities of haptic feedback from small-scale (sub-millimeter) movements to flexures that are visible to the eye. Thereby, in addition to haptic responses to touch UIs (such as the touch screen 24, for example), various haptic interactions can be considered. By way of example, the mobile device 10 could be caused to bend to mimic the contours of a user's face while making a call, or could "wave" at a user when an incoming call or message is received. Naturally, many use cases can be envisaged for this additional gross actuation of the mobile device 10.

Various exemplary embodiments of the invention also provide advantages in that the arrangement of the EAP/PEP implemented in the voids (or spaces) between the castellation portions 48 can impart a bending and/or twisting movement to the mobile device. The type and range of motions that can be achieved are dependent on the EAP or PEP electro-mechanical properties, the rigidity and dimensions of the rigid housing section 12, the housing design and placement of the EAP/PEP 50, the number and placement of the EAP/PEP electrodes 52, 162 and the number of individual EAP/PEP drivers and/or multiplexors. Exemplary electrode placements are illustrated in FIGS. 7-8 and 10-11, and one skilled in the art should understand that that in order to maximize movement, all electrodes would be energized with the same polarity on one side of the neutral plane, and the opposite polarity if there are cells on the other side of the neutral plane. If all EAPs/PEPs are driven with the same polarity, then one type of motion can be generated. However, if some EAPs/PEPs are driven with one polarity, while others are driven with the opposite polarity, a different movement can be achieved. By using one driver and a switch to change the polarity of the connections, alternative movements can be implemented on demand. Hence switches or multiplexors can be used to change the reaction of the mobile device 10 from a pure rotation in one direction to a reversible rotation about the same or multiple axes, or a linear extension or compression about one of more planes.

According to various exemplary embodiments, another advantage of using the EAP/PEP 50 in between the ridges (or castellations) 48, is that energy could be harvested from bending and twisting the device 10 while the haptic response is not required. For example, in the same way that the dimension of the EAP/PEP 50 changes when a voltage is applied across the material, the reverse process can be used to generate a voltage across the material by compressing it. This has the advantage that the EAP/PEP material 50 inserted between the castellations 48 could be used to generate energy to replenish the mobile device battery 101. This is particularly useful should the battery lose charge and the user be unable otherwise to make an emergency call. Dependent on the amount of EAP/PEP used, the configuration of the EAP/PEP cells and the properties of the EAP/PEP material, a number of repeated 'bend' cycles (such as, bending portions of the housing 12, for example) may be able to generate enough energy to power the device 10 to make a phone call or replenish the battery to some extent.

It should be noted that while the various exemplary embodiments have been described in connection with castellated (ridged) regions arranged uniformly along the lateral sides of the housing 12, one skilled in the art will appreciate that the various exemplary embodiments are not necessarily so limited and that other configurations for the castellated (ridged) regions may be provided. For example, and referring now also to FIGS. 12-17, alternate embodiments of the invention are shown.

Referring now to FIGS. 12-13, in this example embodiment, the housing 212 is similar to the housing 12. For example, similar to the housing 12, the housing 212 comprises a hybrid structure having castellated (ridged) regions 48. The housing 212 comprises castellated (ridged) regions 48 that are configured reduce the bending moment of the cross-section of the housing 12 (and the device 10). These castellations can be located on any surface (such as lateral sides, top end, and bottom end, of the housing, for example) which is required to bend. In this example embodiment, the housing 212 further comprises castellated (ridged) regions 48 at the top and bottom ends of the housing 12. Also similar to the housing 12, the housing 212 comprises the flexible material 50 (such as an electro-active polymer, for example) and the electrodes 52 at the voids between the castellated regions 48.

Figure 14:
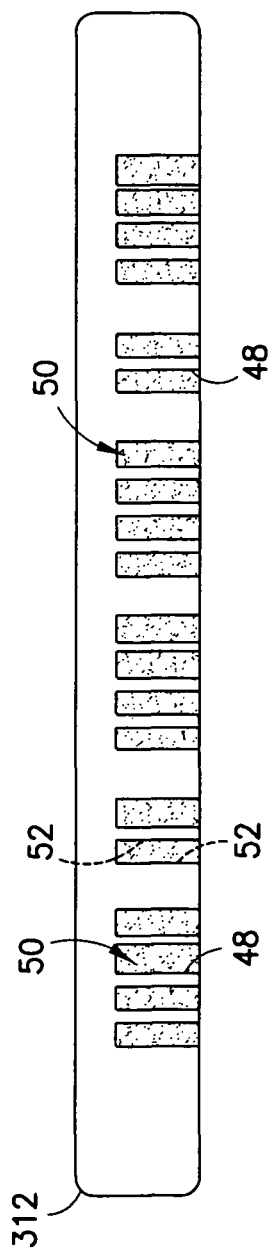
FIG. 14 is a side view of another example housing used in the device shown in FIG. 1.
Figure 15:
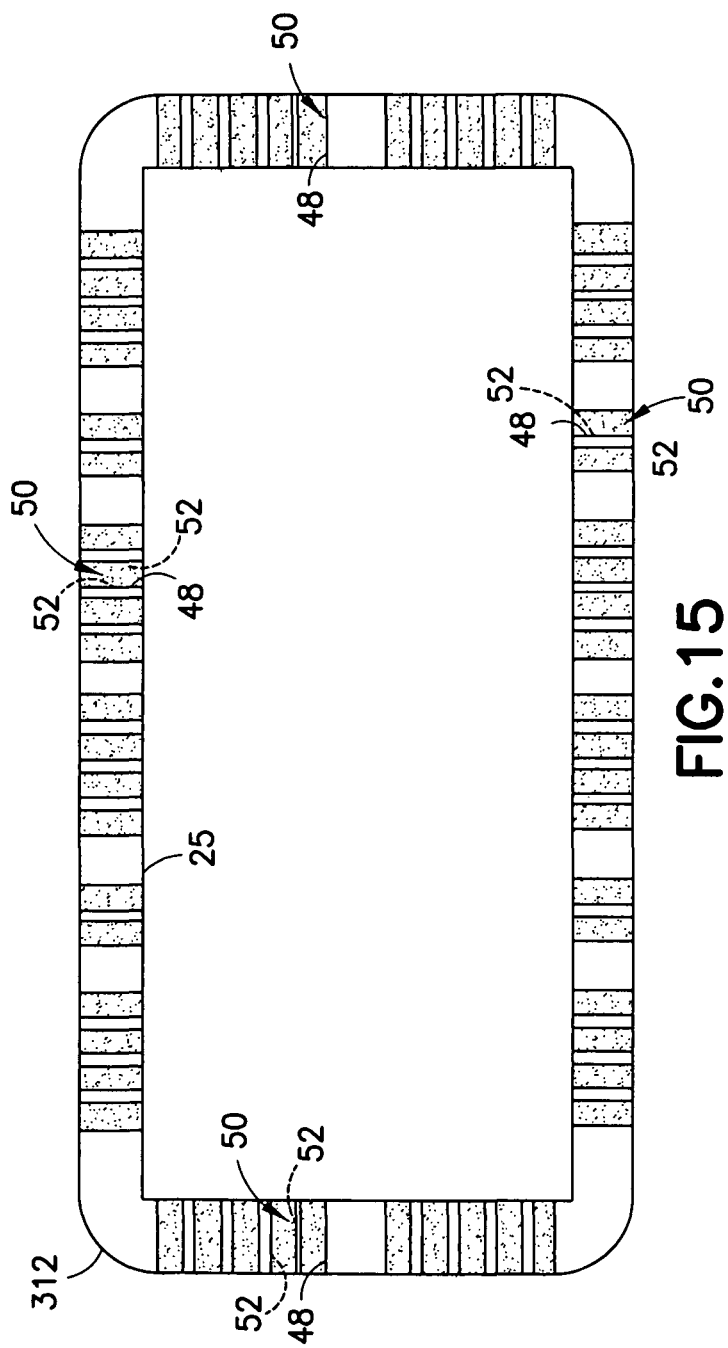
FIG. 15 is a top view the housing shown in FIG. 14.

Referring now to FIGS. 14-15, in this example embodiment, the housing 312 is similar to the housing 12. For example, similar to the housing 12, the housing 112 comprises a hybrid structure having castellated (ridged) regions 48. The housing 312 comprises a non-uniform distribution of the castellated (ridged) regions 48. The spaces, or grooves, between the castellations 48 may or may not be filled with EAP/PEP and the spacing and orientation of the castellations and grooves can be modified in order to limit the degree of bending about any chosen plane by physical interference of the castellations. Also similar to the housing 12, portions of the housing 312 having the flexible material 50 (such as an electro-active polymer, for example) further comprises the electrodes 52 at the voids between the castellated regions 48.

Figure 16:
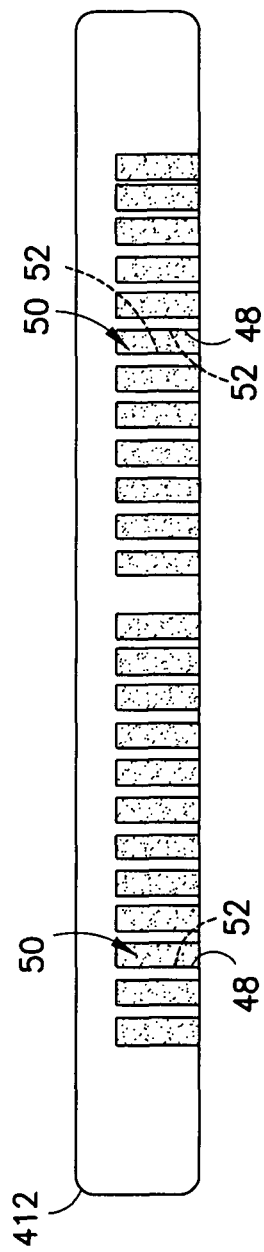
FIG. 16 is a side view of another example housing used in the device shown in FIG. 1.
Figure 17:
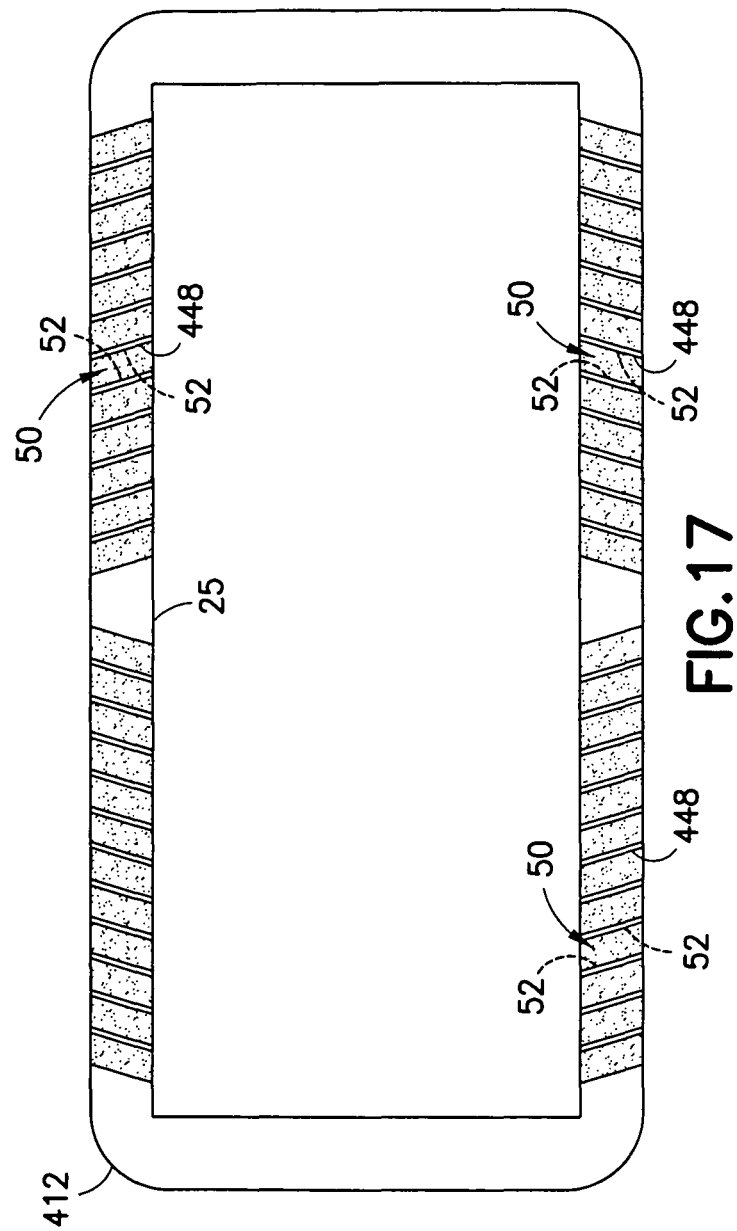
FIG. 17 is a top view the housing shown in FIG. 16.

Referring now to FIGS. 16-17, in this example embodiment, the housing 412 is similar to the housing 12. For example, similar to the housing 12, the housing 412 comprises a hybrid structure having castellated (ridged) regions 448. The castellated (ridged) regions 448 are similar to the castellated (ridged) regions 48, however, in this embodiment the castellations are substantially angled with respect to the lateral sides of the housing 412, and in other alternate embodiments can be of a variety of shapes, and need not be rectangular. As shown in FIGS. 16-17, the castellations 448 may be oriented with respect to the device edges and may limit the degree of bend or twist. Also similar to the housing 12, the housing 412 comprises the flexible material 50 (such as an electro-active polymer, for example) and the electrodes 52 at the voids between the castellated regions 448.

According to various exemplary embodiments of the invention the advantages described above may not all be necessarily utilized in a single device. By way of example, in some embodiments of the invention it might be that the castellations are designed and implemented in such a way that the neutral plane is not moved or placed close to the plane of the display, but rather that the castellations and use of EAPs/PEPs is implemented principally to allow haptic response, including potentially large movements about more than one axis of the device. These movements might be designed to be linear, such as stretching or compressing the length of the device, using designs similar to those shown in FIGS. 18-19 or 20-21. Hence various exemplary embodiments of the invention might be implemented solely to achieve a haptic response, or energy harvesting, or movement of the neutral strain plane, or any combination of two or more of these concepts.

Referring now to FIGS. 18-19, in this example embodiment, the housing 512 is similar to the housing 12. For example, similar to the housing 12, the housing 512 comprises a hybrid structure having castellated (ridged) regions 568. The castellated (ridged) regions 568 are similar to the castellated (ridged) regions 48, however, in this embodiment the castellations may extend through the entire cross-section to allow linear extension or contraction of the housing 512 (and the mobile device 10). According to some embodiments of the invention, one or more common spines 580 run along the length of the device with ribs 582 extending outwards towards the edge (or lateral sides) of the device 10. The central rib 580 holding the spines 582 together may either be of sufficiently small cross-section to allow extension, or may be a co-moulded, softer polymer than the rigid body. The EAP/PEP 50 is located towards the outer edges (or lateral sides) of this configuration, and because the grooves now extend across the entire cross section, when the EAP/PEP expands or contracts the sides are caused to elongate or shrink. If the spine is of narrow cross section and suitable Young's modulus it will be able to stretch, thereby allowing the entire device to extend or compress. According to some embodiments of the invention, one way to achieve this would be to overmould the relatively stiff or rigid ribs in a softer material, creating a soft spine or spines. Under these circumstances, the display and window will also 'slip' or 'stretch' too, or the linear extension will be converted into a bending moment about the neutral plane of the assembly cross-section. Also similar to the housing 12, the housing 512 comprises the electrodes 52 at the flexible material 50. Equally the EAPs along one side only may be actuated in such a way as to cause an expansion of that side, while the EAPs on the other edge are caused to shrink. This would cause the overall device to bend, and if this actuation was undertaken using a sawtooth driving signal, it may cause the device to rotate.

In FIGS. 20-21, an alternative embodiment is shown, in this example embodiment, the housing 612 is similar to the housing 512. For example, similar to the housing 512, the housing 612 comprises a hybrid structure having castellated (ridged) regions 678. The castellated (ridged) regions 678 are similar to the castellated (ridged) regions 568, however, in order to allow linear extension or contraction of the mobile device, the section supporting the rigid ribs may be designed in a number of ways to accommodate linear motion without excessive thinning of the rigid material. One exemplary way to achieve this is to translate the linear stress into a bending force on the thinned section, thereby allowing greater strain. The configuration of the housing 612 can achieve an extension or compression on the device 10 potentially using a singular relatively stiff (but non-brittle) material for the housing moulding. In this example embodiment, several apertures 690, 692 are provided in the back-side of the device and the ribs 682, 684, 686 extend close to the apertures 690. Similar to the configuration of the flexible material shown in FIGS. 18-19, the EAP/PEP 50 is located towards the outer edges (or lateral sides) of the housing 612, as the grooves extend across the entire cross section. Additionally, the housing 612 comprises the electrodes 52 at the flexible material 50. The ribs 682, 684, 686 and apertures 690 are positioned such that as the EAPs/PEPs expand or contract, the movement of the ribs is translated into a bending moment in the housing material about the aperture, causing the aperture to distort. This allows greater extension of the assembly before reaching the yield conditions of the material. The example embodiment illustrated in FIGS. 20-21 shows the use of oval apertures, but in alternate embodiments the apertures and spines could be of any combination of shapes that translates the linear extension of the sides into a bending moment in the material around the apertures.

Various exemplary embodiments of the invention provide combinations of ridges and castellations which may be used to limit the degree of motion in more than one direction. According to some embodiments of the invention, it may be desirable for ease of manufacture and cost that these ridges can be formed by moulding, and if this process is used there may be restrictions placed on the dimensions of the ridges or castellations derived by the mold release requirements. Additionally, in some embodiments there may also be a use of the tips of the ridges or castellations as a means to prevent overbending or twisting, and so the width and shape of the castellations may be configured in alternative ways to limit these movements by mechanical interference.

Figure 22:
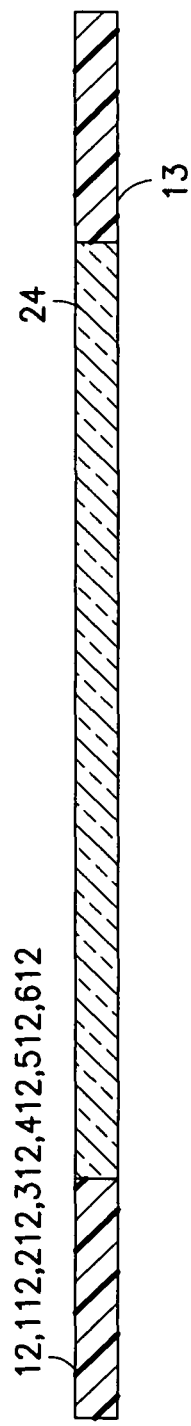
FIG. 22 is a section view of a housing used in the device shown in FIG. 1.
Figure 23:
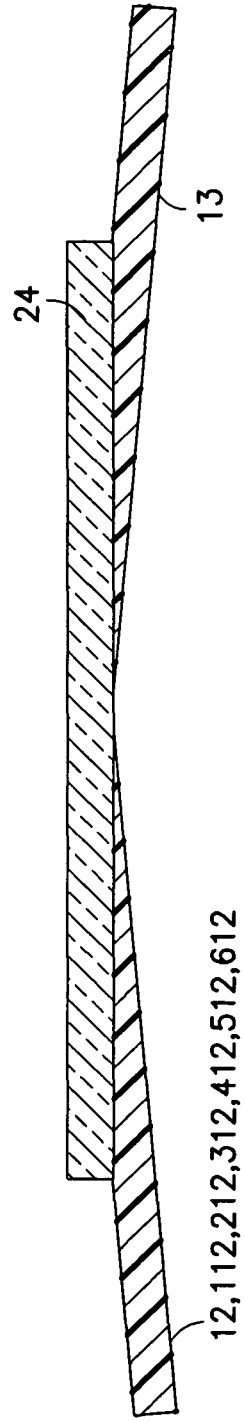
FIG. 23 is a section view a housing in a bend or flex state used in the device shown in FIG. 1.

According to various exemplary embodiments of the invention, the flexible housing may further be configured for protecting the display. For example, when the housing 12, 112, 212, 312, 412, 512, 612 is in a non-flexure (or non-bending) state, for example before the housing undergoes any movement or bending motion(s), the display 24 is disposed in a substantially flush configuration with respect to the exterior face (or surface) 13 of the housing (as shown in FIG. 22). However, in some exemplary embodiments of the invention, the housing 12, 112, 212, 312, 412, 512, 612 is configured to bend or flex such that portions of the housing move in a direction away from the display 24 (as shown in FIG. 23). This provides for portions of the display, such as the edges for example, to be spaced from the exterior face 13 of the housing (and no longer in a flush configuration with the exterior 13 of the housing), when the housing bends, flexes, or twists (or undergoes any other movement). With portions of the display 24 spaced from the exterior 13 of the housing, this may protect the display 24 from damage due to a drop or any other impact at or near the display 24. Should the device comprise an accelerometer or other device capable of measuring a sudden impact or fall under gravity, then the device could be figured to curl the display inwards, so that on impact the display is protected. It should be noted that while various exemplary embodiments of the invention have been described above in connection with edges of the display to be spaced from the exterior face 13 of the housing 12, 112, 212, 312, 412, 512, 612 when the housing bends, one skilled in the art will appreciate that embodiments of the invention are not necessarily so limited and that the housing may be configured such that any suitable portion of the display (or all of the display) may be spaced from the exterior face 13 of the housing 12, 112, 212, 312, 412, 512, 612 when the housing bends.

Figure 24:
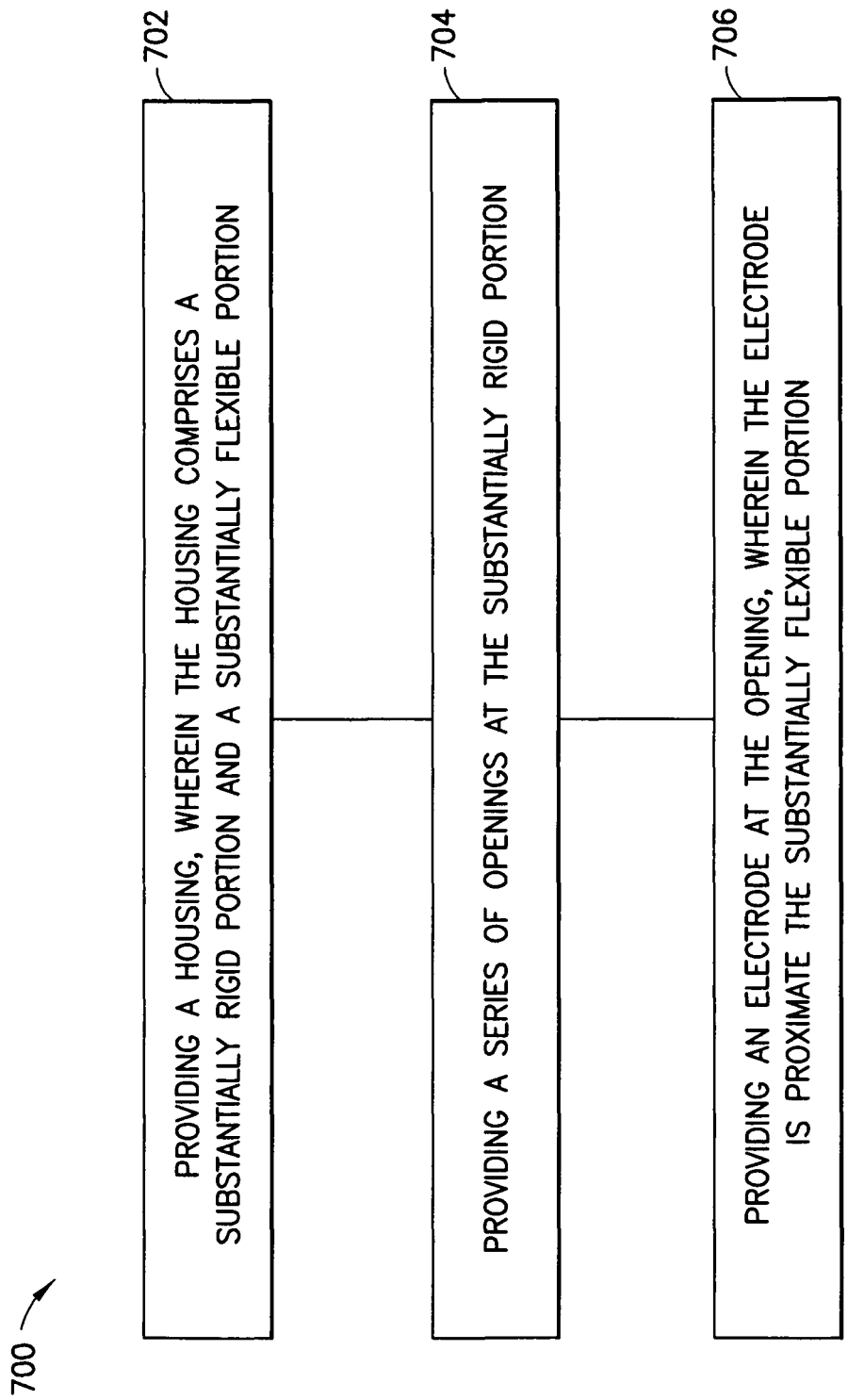
FIG. 24 is a block diagram of an exemplary method incorporating features of the invention.

FIG. 24 illustrates a method 700. The method 700 includes providing a housing, wherein the housing comprises a substantially rigid portion and a substantially flexible portion (at block 702). Providing a series of openings at the substantially rigid portion, and wherein the substantially flexible portion is at the series of openings (at block 704). Providing an electrode at the opening, wherein the electrode is proximate the substantially flexible portion, and wherein the substantially flexible portion is configured to provide haptic feedback, or generate a voltage (at block 706). It should be noted that the illustration of a particular order of the blocks does not necessarily imply that there is a required or preferred order for the blocks and the order and arrangement of the blocks may be varied. Furthermore it may be possible for some blocks to be omitted.

Figure 25:
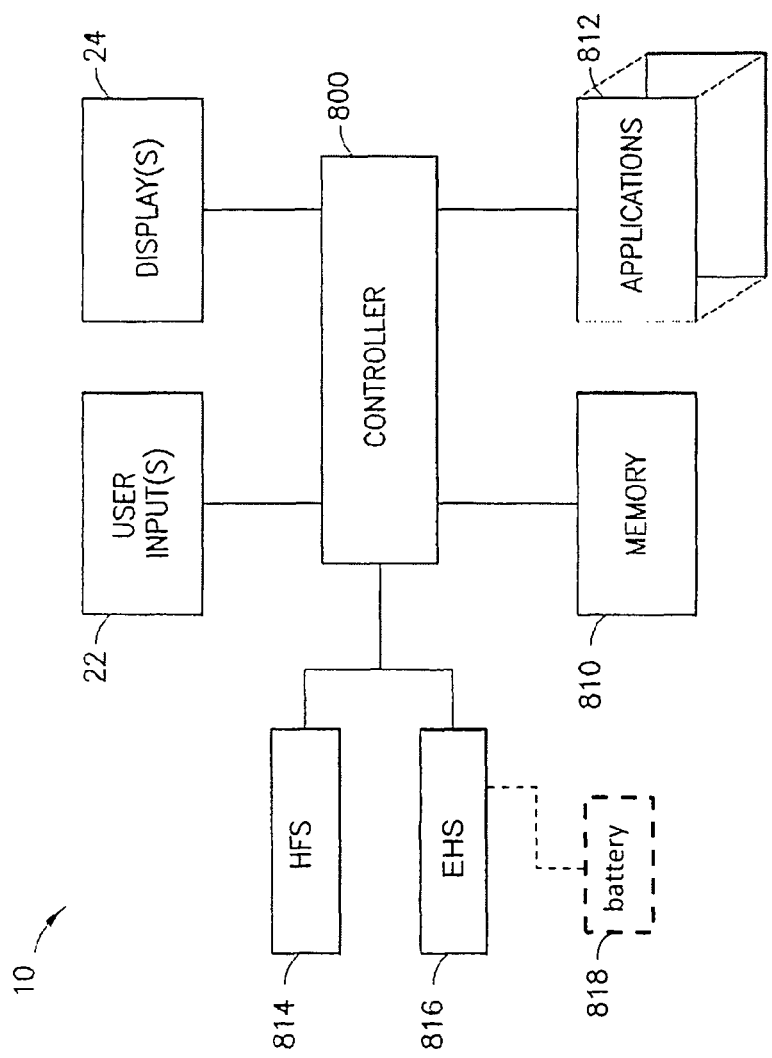
FIG. 25 is a schematic drawing illustrating components of the device shown in FIG. 1.

Referring now also to FIG. 25, the device 10 generally comprises a controller 800 such as a microprocessor for example. The electronic circuitry includes a memory 810 coupled to the controller 800, such as on a printed circuit board for example. The memory could include multiple memories including removable memory modules for example. The device has applications 812, such as software, which the user can use. The applications can include, for example, a telephone application, an Internet browsing application, a game playing application, a digital camera application, a map/gps application, for example. These are only some examples and should not be considered as limiting. One or more user inputs 22 are coupled to the controller 800 and one or more displays 24 are coupled to the controller 800. Additionally, a haptic feedback system (HFS) 814 and an energy harvesting system (EHS) 816 can also be coupled to the controller 800. According to various exemplary embodiments of the invention the haptic feedback system may be connected to a driver and a switch (or multiplexer) to change the polarity of the connections to the electrodes, to change the reaction of the haptic feedback of the mobile device 10. According to various exemplary embodiments of the invention the energy harvesting system may be connected to a battery 818 of the device 10 and may further include a battery charging system to charge the battery when the device/housing undergoes bending and/or twisting cycles. The device 10 may programmed to automatically provide haptic feedback and/or harvest energy. However, in an alternate embodiment, this might not be automatic. The user might need to actively select the haptic feedback and/or energy harvesting capabilities.

Without in any way limiting the scope, interpretation, or application of the claims appearing below, a technical effect of one or more of the example embodiments disclosed herein is to provide for the use of a hybrid structure, using EAPs, PEPs or electrostatic plates between features of the relatively rigid housing material in order to: control the moment of inertia of the housing cross-section, while allowing flexibility; provide a means to limit over-bending or twisting; implement novel haptic feedback response; harvest energy.

Various exemplary embodiments of the invention provide for the use of flexible TFTs to enable TFT manufacture on plastic substrates. It is recognized that both OLEDs and TFTs developed on plastic substrates are strain sensitive. Accordingly, various exemplary embodiments of the invention integrate flexible displays into the device to ensure that the display is maintained close to the neutral strain plane within the device, unless the display is allowed to "float" or slip within the device to ensure no strains from the surrounding components are imparted on the display. As mentioned above, some embodiments of the invention provide for mounting a flexible display within a device with a window proximate the exterior of the housing.

In order to minimize the transferred strain, and maintain the display in the neutral strain plane of the assembly, various exemplary embodiments of the invention ensure that the stiffness of the assembly mounted above the display (for example, the touch panel, the OCA and window assembly) are as close as possible to the bulk stiffness of the assembly beneath the display (device body, circuits and battery).

According to some exemplary embodiments of the invention, haptic feedback for the user interfaces is incorporated into the mobile device. In conventional configurations, such haptic feedback is generally provided by eccentric electric motors, or vibras, which spin an eccentric mass around to vibrate the whole mobile device. Because it takes time to spin up the motors, and this consumes energy, the power consumption of vibras is relatively high. An alternative approach is to use piezoelectric or speaker-coil type actuators that convert electrical energy directly into a displacement, and such actuators are typically mounted behind displays to impart accelerations directly on the displays for the haptic response. Other haptic user interface designs use electrostatic forces to pull the window or display towards a capacitive plate mounted inside the device. Typically these conventional devices are coupled to touch panels, so that the vibrational feedback is linked to touch input.

According to various exemplary embodiments of the invention, Electro-Active Polymers (EAPs) or Piezoelectric Polymers (PEPs) are used for haptic response. Previously, these materials have generally required very high voltages across them in order to generate movement, however exemplary embodiments of the invention allow for the required voltages to be reduced. For example, some embodiments of the invention may use multi-layer lamellar structures of EAPs/PEPs and electrodes, which can allow lower voltages to be used while still generating appreciable movements.

Generally, in conventional configurations, in order for all these technologies to generate haptic feedback, the actuators, whether rotational, linear, electrostatic or compressive, generally use a proof mass to be displaced relative to the frame of the actuator. In the case of a vibra, an eccentric mass is spun with respect to the mobile device body to generate accelerations. In the case of piezoelectric, speaker coil, electrostatic and prospective EAP technologies, generally the display is mounted using a flexible adhesive to the body of the mobile device and the actuator rigidly coupled to both the display and the body. In this way, when a haptic response is provided, the display is displaced relative to the body, using the display as the proof mass. However, with all these conventional implementations, each of the actuator technologies must be designed to be extremely thin, as increasing mobile device thickness is an undesirable consequence. Haptic actuators therefore aim to be as small as possible so as not to take up much printed circuit board space or increase device thickness. This limits the total displacement the actuators can achieve in conventional configurations, and typically the displacements are sub-millimeter, limiting the capabilities of the haptic feedback responses of conventional configurations.

According to some embodiments of the invention, there can also be provided features to harvest energy from the mobile devices, as battery performance is generally progressing more slowly than device usage. Technical effects of any one or more of the exemplary embodiments provide improved energy harvesting capabilities when compared to conventional configurations which use solar cells and accessories to provide emergency or back-up power to mobile devices for use in locations where remote power sources are not available.

Technical effects of any one or more of the exemplary embodiments provide an improved device housing when compared to conventional configurations which provide the following advantages: flexibility and maintaining the display in the neutral plane; haptic feedback; energy harvesting capabilities.

Without in any way limiting the scope, interpretation, or application of the claims appearing below, a technical effect of one or more of the example embodiments disclosed herein is providing an improved implementation of EAP/PEP technology that is hitherto unknown. Another technical effect of one or more of the example embodiments disclosed herein is providing a novel haptic user interface can be constructed capable of generating very large bending, twisting, expanding or contracting movements in either linear or rotational directions. Another technical effect of one or more of the example embodiments disclosed herein is providing a configuration so that energy can be harvested by bending or twisting the device. Another technical effect of one or more of the example embodiments disclosed herein is allowing a flexible mobile device that minimizes the strain imparted on the device display. Another technical effect of one or more of the example embodiments disclosed herein is that various exemplary embodiments of the invention can be used on any capacitive touch screen device. Another technical effect of one or more of the example embodiments disclosed herein is providing a method of using EAP (electro active polymer) or Piezoelectric Polymer (PEP) actuators in a mobile device for maintaining the display at neutral strain plane in the cross section of the mobile device, providing haptic feedback response, and generating energy by harvesting.

Another technical effect of one or more of the example embodiments disclosed herein is providing an apparatus which has a flexible body that includes EAP (electro-active polymers) or Piezoelectric Polymer (PEP) actuators to keep the display at the neutral strain plane in the cross section of the flexible apparatus. Another technical effect of one or more of the example embodiments disclosed herein is that the EAP/PEP actuators can be implemented in the flexible apparatus housing with the display and can keep the neutral strain plane in the cross section of the flexible apparatus during bending of the apparatus. Another technical effect of one or more of the example embodiments disclosed herein is that the EAP/PEP actuators can provide haptic feedback response and generate energy by harvesting. The display, which in some embodiments is not as flexible as the flexible apparatus housing, can keep at the neutral strain plane in the cross section of the flexible apparatus housing by EAP/PEP actuators that can also use for haptic feedback response and/or energy harvesting during bend. Another technical effect of one or more of the example embodiments disclosed herein is providing for haptic feedback with large movements including bending and twisting. Another technical effect of one or more of the example embodiments disclosed herein is providing all small displacements in linear motion. Another technical effect of one or more of the example embodiments disclosed herein is providing for large movements, with expansion, contraction, bending and twisting possible. Another technical effect of one or more of the example embodiments disclosed herein is providing a flexible apparatus that uses display panels that are not as flexible as their housings, and providing display panel configurations that prevent damage to when flexible apparatuses are bent.

It should be noted that while various exemplary embodiments have been described above in connection with a display, a display aperture, and/or moving the neutral plane, one skilled in the art will appreciate that the various embodiments of the invention are not necessarily so limited and that some embodiments may not include a display and/or display aperture, and may not be configured to move the neutral plane. For example, some embodiments of the invention may include wrist-worn and other wearable devices, such as a watch (or "smart" watch), or wrist-worn or clip-on notification, or sensing device, or MP3 players and remote sensors, for example, where the EAPs might be used as a notification or acknowledgement haptic response, as described above. Additionally, according to some embodiments of the invention, the EAP material may be added simply to a watch, to notify the user of an incoming call or message, or to notify the user that you are passing by a particular store (such as a store that sells the user's wife's favourite perfume, for example). However, these are provided as non-limiting examples, and any type of notification may be provided.

Figure 26:
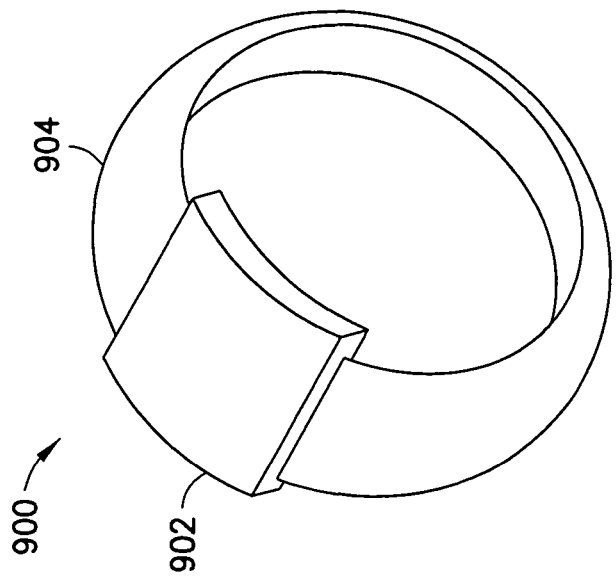
FIG. 26 is a perspective view of a wearable device incorporating features of the invention.

For example, and referring now also to FIG. 26, there is shown a wearable device 900, according to various exemplary embodiments of the invention, that could be worn around a wrist or ankle. The device 900 is similar to the device 10 and may comprise electronic circuitry, such as a controller (which could include a processor, for example) and a memory for example, and a user input region. However, the device 900 may or may not have a visible display screen, depicted by the raised square area 902. In other embodiments the device may be a smooth band without distinguishing surface features, with a display embedded in the band. However, any suitable configuration may be provided. Similar to the device 10, the device 900 may include a flexible material comprising an electroactive polymer (EAP) or piezoelectric material (PEP), such as Polyvinylidene fluoride. Accordingly, the entire band 904, or sections of the band or wearable device may include the EAP/PEP material and may be actuated (such as for providing haptic feedback response, and/or generating energy by harvesting).

Figure 27:
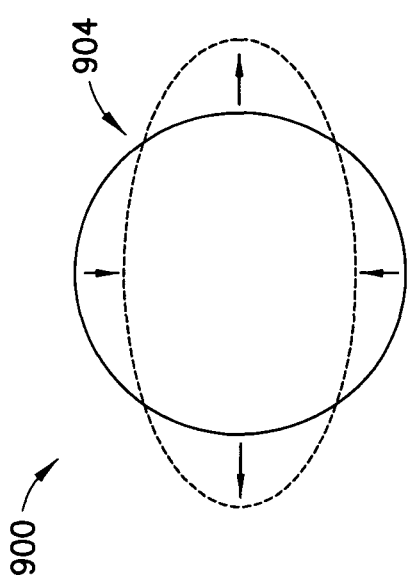
FIGS. 27-28 are section views of the device shown in FIG. 26.
Figure 28:
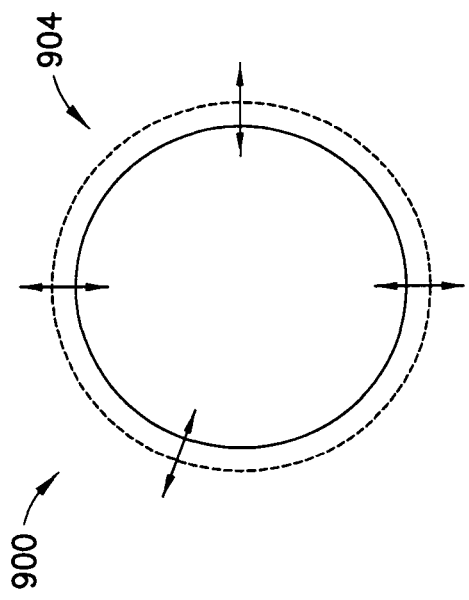

Referring now also to FIGS. 27-28, illustrations by which the band 904 might be actuated are shown. In FIG. 27, it can be seen that the band 904 could be made to distort, changing the overall shape of the band 904. By way of the example shown, the profile of the band 904 may change from circular to elliptical or vice versa. In FIG. 28, the band 904 retains the initial shape, but may either expand or contract. However, it should be understood that any other suitable type of contortions are possible.

Figure 30:
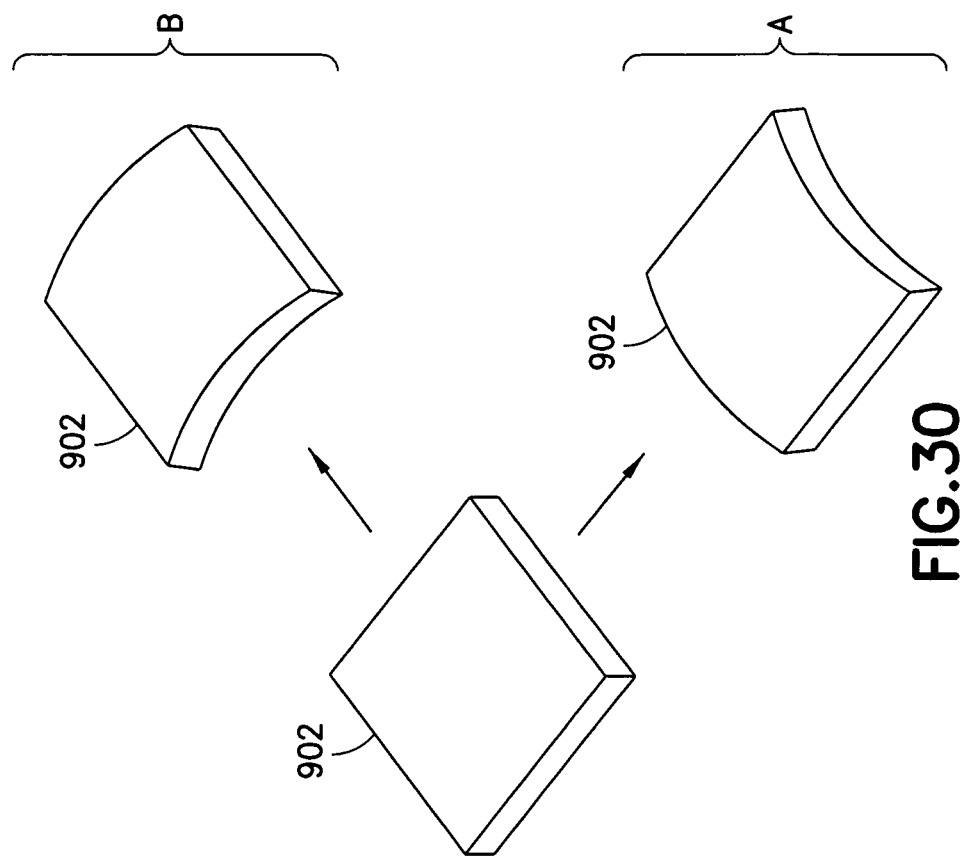
FIGS. 29-30 are views of the device shown in FIG. 26 in bending configurations.
Figure 29:
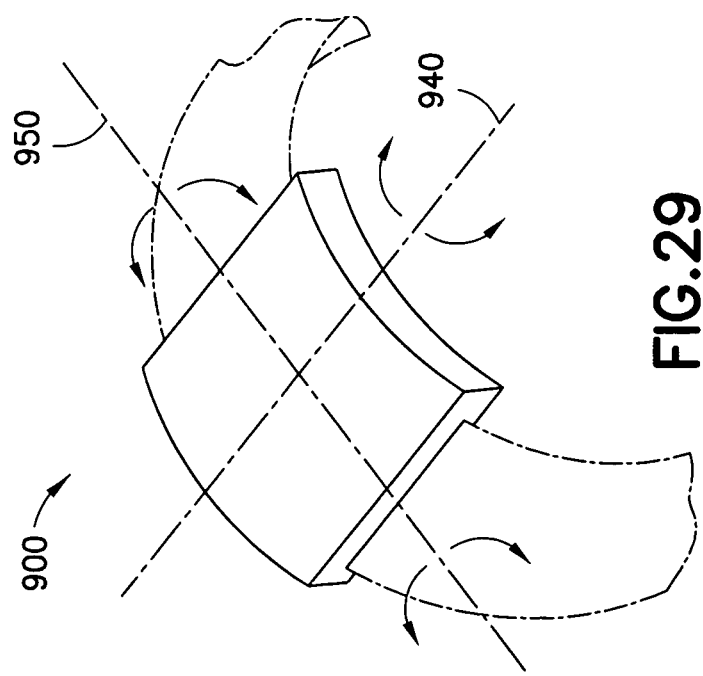

Referring now also to FIG. 29, the section of the band 902, which may or may not be associated with a display, is shown reference to a first axis 940 and a second axis 950. According to various exemplary embodiments of the invention, the section 902 of the band could bend about more than one axis, such as the axis 940 or the axis 950, for example. Referring now also to FIG. 30, portion "A" of FIG. 30 illustrates the section 902 in a configuration where the section bends about the axis 940, and portion "B" of FIG. 30 illustrates the section 902 in a configuration where the section bends about the axis 950.

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Embodiments of the present invention may be implemented in software, hardware, application logic or a combination of software, hardware and application logic. The software, application logic and/or hardware may reside on the device. However, in alternate embodiments, part of the software, application logic and/or hardware may reside at any suitable location. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 25. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

In one exemplary embodiment, an apparatus, comprising a housing having substantially rigid portion and a substantially flexible portion, wherein the substantially rigid portion comprises a plurality of openings, and wherein the substantially flexible portion is at the plurality of openings, and wherein the substantially flexible portion is configured to provide haptic feedback, or generate a voltage.

An apparatus as above, wherein the substantially flexible portion comprises a substantially flexible material configured to provide haptic feedback in response to a voltage applied at the substantially flexible material.

An apparatus as above, wherein the apparatus further comprises an electrode at the substantially flexible material and the electrode is configured to apply the voltage.

An apparatus as above, wherein the substantially flexible portion is configured to generate a voltage in response to a bending or twisting of the housing.

An apparatus as above, wherein the substantially flexible portion comprises an electro-active polymer.

An apparatus as above, wherein the openings are between castellated or ridged regions of the housing.

An apparatus as above, wherein the openings extends through a majority of a cross section of the housing.

An apparatus as above, wherein the openings are proximate a lateral side of the housing.

An apparatus as above, wherein the plurality of openings extend along a majority of a length of the lateral side.

An apparatus as above, wherein the apparatus further comprises a display connected to the housing, wherein the substantially flexible portion is configured to flex the housing from a first position to a second position in response to a voltage applied at the substantially flexible portion, and wherein the second position is configured protect the display.

An apparatus as above, wherein the display comprises a substantially flexible display.

An apparatus as above, further comprising: at least one processor; and at least one memory including computer program code, the at least one memory and the computer program code configured to, with the at least one processor, cause the apparatus to perform at least the following: provide a haptic feedback to the device, wherein the haptic feedback comprises substantial bending or twisting of the device.

An apparatus as above, further comprising: at least one processor; and at least one memory including computer program code, the at least one memory and the computer program code configured to, with the at least one processor, cause the apparatus to perform at least the following: generate a voltage for an energy harvesting system of the device in response to a substantial bending or twisting of the device.

An apparatus as above, wherein the apparatus comprises mobile phone or a wearable device.

In another exemplary embodiment, a method is disclosed. The method, comprising: providing a housing, wherein the housing comprises a substantially rigid portion and a substantially flexible portion; providing a series of openings at the substantially rigid portion, and wherein the substantially flexible portion is at the series of openings; and providing an electrode at the opening, wherein the electrode is proximate the substantially flexible portion, and wherein the substantially flexible portion is configured to provide haptic feedback, or generate a voltage.

A method as above, wherein the substantially flexible portion comprises a substantially flexible material configured to provide haptic feedback in response to a voltage applied at the electrode.

A method as above, wherein the substantially flexible portion comprises an electro-active polymer.

A method as above, wherein the substantially flexible portion is configured to generate a voltage in response to a bending or twisting of the housing.

In another exemplary embodiment, a computer program product comprising a computer-readable medium bearing computer program code embodied therein for use with a computer, the computer program code comprising: code for energizing an electrode, wherein the electrode is at a substantially flexible material of a portable device housing; code for providing a substantial bending or twisting of the portable device housing in response to the energizing of the electrode.

A computer program product as above, wherein the substantially flexible material is comprises an electro-active polymer, and wherein the electro-active polymer is configured to provide haptic feedback at the housing.

A computer program product as above, further comprising code for charging a battery in response to a bending or twisting of the housing, wherein the bending or twisting of the housing is configured to generate a voltage at the substantially flexible material.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus, comprising a housing having a substantially rigid portion and a substantially flexible portion, wherein the substantially rigid portion comprises a plurality of openings, and wherein the substantially flexible portion is at the plurality of openings, and wherein the substantially flexible portion is configured to generate a voltage in response to a bending or twisting of the housing.

2. An apparatus as in claim 1 wherein the substantially flexible portion comprises a substantially flexible material configured to provide haptic feedback in response to a voltage applied at the substantially flexible material.

3. An apparatus as in claim 2 wherein the apparatus further comprises an electrode between a portion of one of the openings and the substantially flexible material and the electrode is configured to apply the voltage.

4. An apparatus as in claim 1 wherein the substantially flexible portion comprises an electro-active polymer.

5. An apparatus as in claim 1 wherein the openings are between castellated or ridged regions of the housing.

6. An apparatus as in claim 1 wherein the openings extend through a majority of a cross-section of the housing.

7. An apparatus as in claim 1 wherein the openings are proximate a lateral side of the housing.

8. An apparatus as in claim 7 wherein the plurality of openings extend along a majority of a length of the lateral side.

9. An apparatus as in claim 1 wherein the apparatus further comprises a display connected to the housing, wherein the substantially flexible portion is configured to flex the housing from a first position to a second position in response to a voltage applied at the substantially flexible portion, and wherein the second position is configured to protect the display.

10. An apparatus as in claim 9 wherein the display comprises a substantially flexible display.

11. The apparatus of claim 1, further comprising:
at least one processor; and
at least one memory including computer program code;
the at least one memory and the computer program code configured to, with the at least one processor, cause the apparatus to perform at least the following:
provide a haptic feedback to the device, wherein the haptic feedback comprises substantial bending or twisting of the device.

12. The apparatus of claim 1, further comprising:
at least one processor; and
at least one memory including computer program code;
the at least one memory and the computer program code configured to, with the at least one processor, cause the apparatus to perform at least the following:
generate a voltage for an energy harvesting system of the device in response to a substantial bending or twisting of the device.

13. An apparatus as in claim 1 wherein the apparatus comprises a mobile phone or a wearable device.

14. An apparatus as in claim 1 wherein the substantially flexible portion is configured to provide haptic feedback.

15. An apparatus as in claim 1 wherein the substantially flexible portion is within a space defined by the openings.

16. A method, comprising:
providing a housing, wherein the housing comprises a substantially rigid portion and a substantially flexible portion;
providing a series of openings at the substantially rigid portion, and wherein the substantially flexible portion is at the series of openings; and
providing an electrode at the openings, wherein the electrode is proximate the substantially flexible portion, and wherein the substantially flexible portion is configured to generate a voltage;
wherein the substantially flexible portion is configured to generate a voltage in response to a bending or twisting of the housing.

17. A method as in claim 16 wherein the substantially flexible portion comprises a substantially flexible material configured to provide haptic feedback in response to a voltage applied at the electrode.

18. A method as in claim 16 wherein the substantially flexible portion comprises an electro-active polymer.

19. A computer program embodied on a non-transitory computer-readable medium, the computer program configured to control a processor to perform a method comprising:
generating a voltage at an electrode in response to a bending or twisting of a portable device housing, wherein the electrode is at a substantially flexible material of the housing; and
charging a battery in response to the generated voltage.

20. The computer program of claim 19 wherein the substantially flexible material comprises an electro-active polymer, and wherein the electro-active polymer is configured to provide haptic feedback at the housing.

* * * * *